United States Patent [19]

Shioya et al.

[11] Patent Number: 4,516,555
[45] Date of Patent: May 14, 1985

[54] FUEL FEEDING SYSTEM FOR AN INTERNAL COMBUSTION ENGINE

[75] Inventors: Toshio Shioya; Katsuhiko Kimura, both of Saitama, Japan

[73] Assignee: Honda Giken Kogyo Kabushiki Kaisha, Tokyo, Japan

[21] Appl. No.: 603,558

[22] Filed: Apr. 24, 1984

[30] Foreign Application Priority Data

Apr. 25, 1983 [JP] Japan .................................. 58-72439

[51] Int. Cl.³ .............................................. F02M 55/00
[52] U.S. Cl. ..................................... 123/470; 123/300
[58] Field of Search ............... 123/468, 469, 470, 471, 123/299, 300, 456

[56] References Cited

U.S. PATENT DOCUMENTS

| | | | |
|---|---|---|---|
| 3,776,209 | 12/1973 | Wertheimer et al. | 123/470 |
| 3,930,483 | 1/1976 | Blisko et al. | 123/470 |
| 4,031,867 | 6/1977 | Yasuda et al. | 123/299 |

FOREIGN PATENT DOCUMENTS

| | | | |
|---|---|---|---|
| 78716 | 5/1983 | European Pat. Off. | 123/470 |
| 2712959 | 9/1978 | Fed. Rep. of Germany | 123/470 |
| 130742 | 8/1919 | United Kingdom | 123/300 |

*Primary Examiner*—Magdalen Y. C. Moy
*Attorney, Agent, or Firm*—Lyon & Lyon

[57] ABSTRACT

A fuel injection system having a fuel distributor which is connected to a fuel supply tube. The main fuel nozzles are fitted into openings in the lower surface of the fuel distributor and holes in the intake manifold near the main combustion chambers. A holding member supports the mid portion of the fuel nozzles and is connected to the fuel distributor. A fuel branching member is connected to the upper surface of the fuel distributor to supply fuel to the sub fuel injection nozzle. A cap seals the second end of the branched fuel passage from the atmosphere. An accommodating chamber is formed within a holding cylinder which is fitted about the leading end portion of the sub fuel injection nozzle. A fuel mixer is fitted within the accommodating chamber to emulsify the fuel. The emulsion is then injected into the unit sub intake passage through an emulsion tube. A holding member retains the sub fuel injection nozzle about its mid portion and is attached to the fuel branching member. The fuel branching member is attached to the fuel distributor to securely mount the sub fuel injection nozzle. A regulator valve is attached to the branched fuel passage to regulate the fuel pressure of the main injection nozzles and the sub injection nozzles.

8 Claims, 2 Drawing Figures

FUEL FEEDING SYSTEM FOR AN INTERNAL COMBUSTION ENGINE

The field of the invention is fuel feeding systems for internal combustion engines, and more particularly, fuel feeding systems for an internal combustion engine fuel injection system having a plurality of main combustion chambers and sub combustion chambers.

In the context of the most common use of an internal combustion engine, i.e. automobile engines, it is necessary to provide a system to supply fuel to each of the combustion chambers within the engine. A typical multi-cylinder internal combustion engine will have a body with a plurality of main combustion chambers and sub combustion chambers. An intake manifold including a plurality of main intake passages to communicate with said main combustion chambers and a plurality of sub intake passages to communicate with said sub combustion chambers is attached to the engine and body. The sub intake passages converge upstream into a single sub unit intake passage. A plurality of main fuel nozzles are fitted into the main intake passages whereas a single sub fuel nozzle is arranged in the unit sub intake passage.

In a fuel injection system of the above type, according to the prior art, a flexible hose is typically used to supply fuel to the plurality of main fuel nozzles or the unit sub fuel nozzle. Such a construction creates a multitude of problems since flexible hoses tend to deteriorate. In addition, since the fuel injection nozzles are attached independently of one another to the intake manifold, the mounting operations of the fuel injection nozzles is troublesome and inefficient in the assembly process.

Therefore it is an object of the present invention to provide a fuel feeding system for an internal combustion engine which has improved in durability over the prior art.

It is a further object of the present invention to provide a fuel feeding system which will increase the efficiency of assembling the fuel injection nozzles into the intake manifold. Other and more detailed objects of the invention will become apparent upon examination of description and drawings contained herein, wherein.

The present device is disclosed in conjunction with a four cylinder engine for purposes of example only and should not be construed to so limit the device as it may apply to any internal combustion engine having at least one combustion chamber and one sub combustion chamber.

Figure 1:
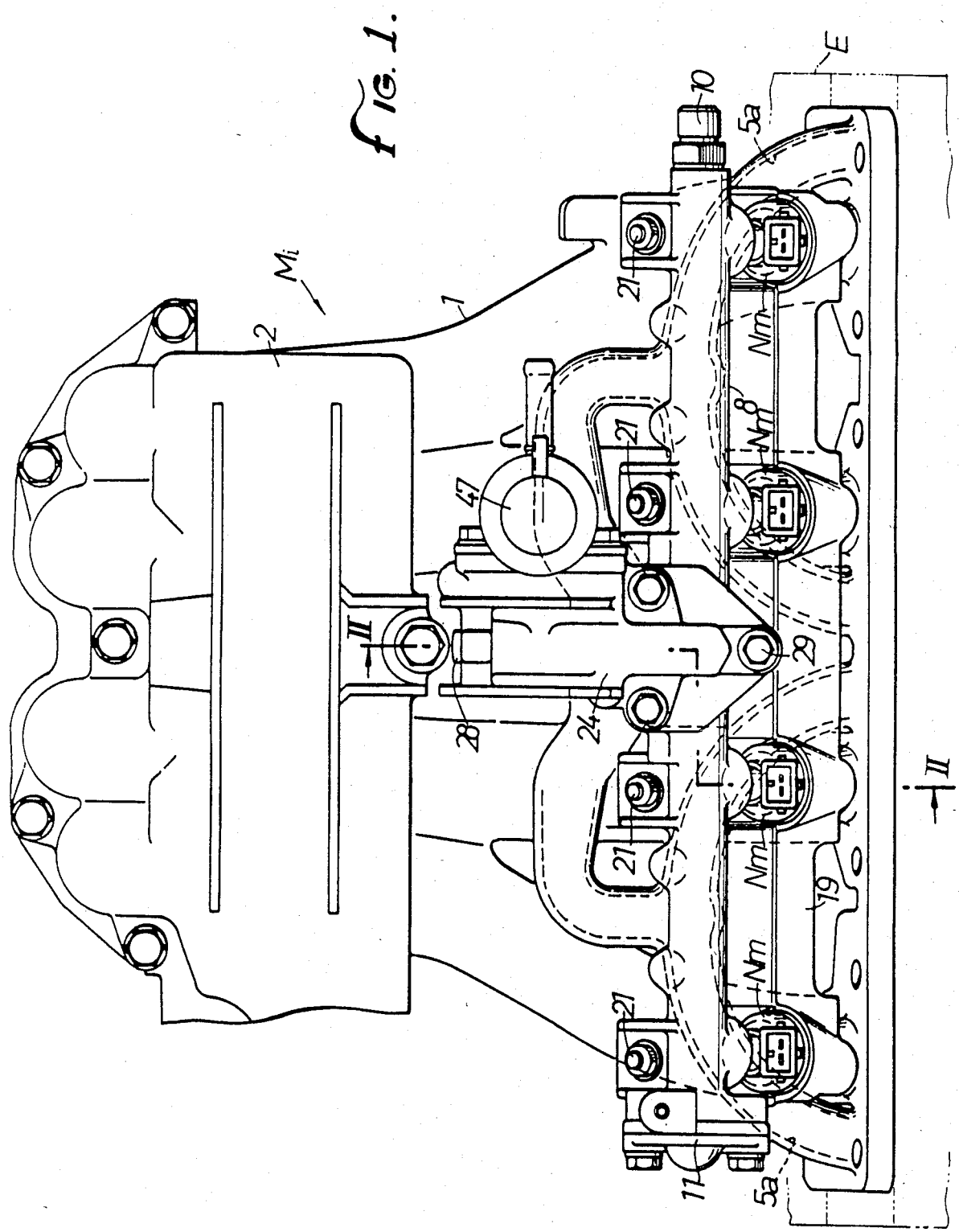
FIG. 1 is top plan view showing an essential portion of the device.
Figure 2:
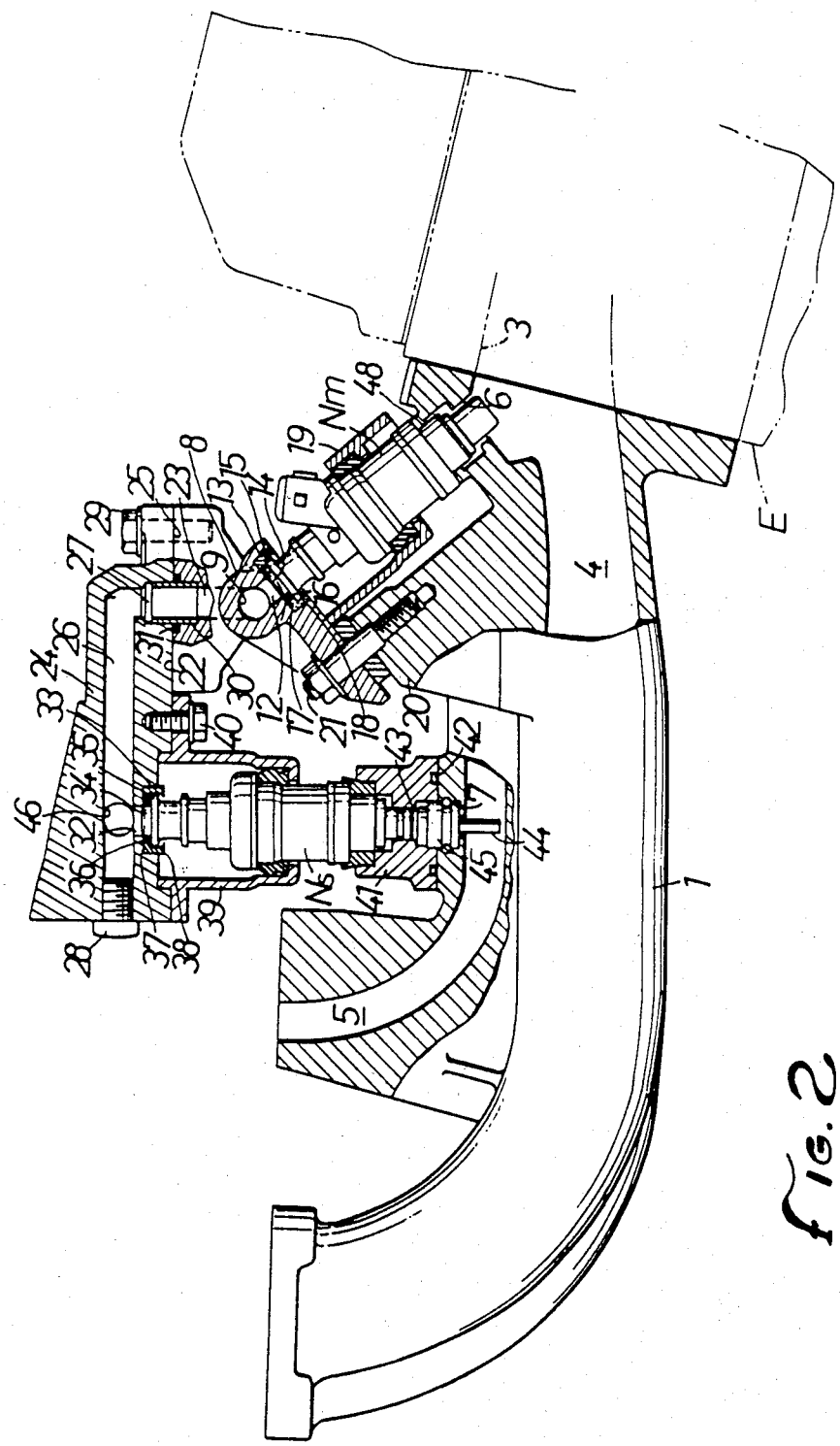
FIG. 2 is a cross-sectional side elevation taken substantially along line II—II of FIG. 1.

As shown in FIGS. 1 and 2, the engine body E of a torch ignition type engine having four cylinders is equipped with a plurality of main combustion chambers (not shown) and a plurality of sub combustion chambers (not shown), which communicate with the main combustion chambers. An intake manifold Mi is connected to the engine body E. The intake manifold Mi is constructed from a branch portion 1 and a trunk portion 2 so that communication is permitted therebetween.

Air, which has its intake rate controlled by a not-shown throttle body, is introduced into the intake manifold Mi. Fuel is injected at the intake ports 3 from the main fuel nozzles Nm into the air which is to be introduced from the intake manifold Mi to the main combustion chambers. Air is supplied to the sub combustion chambers through a separate unit sub intake passage 5 formed in the intake manifold Mi. Sub intake passages 5a provide communication between the unit sub intake passage 5 and the sub combustion chambers. Fuel is injected into the unit sub intake passage 5 air flow in the form of an emulsion through a sub fuel nozzle Ns.

The main intake passages 4 communicate with one another in the trunk portion 2 of the intake manifold Mi and with the primary and secondary bores of the aforementioned throttle body. Air flow through the unit sub intake passage 5 is limited by the sub bore of the throttle body by way of a separate passage in the trunk portion 2 of the intake manifold Mi. As a result, the air controlled by the primary and secondary throttle valves of the throttle body is introduced into the respective intake ports and the main combustion chambers of the engine body E, whereas the air controlled by the sub throttle valve of the throttle body is introduced into the respective sub combustion chambers.

The end portions of each intake passage 4 of the intake manifold branch portion 1 closest to the engine body E are formed with holes 6, open to the intake port 3, in their upper portions. The main fuel nozzles Nm are fitted in the holes 6 through seal members 48. Upstream of the point where the sub intake passages 5a branch from the unit sub intake passage 5, a single hole 7 is formed through the unit sub intake passage 5 into which the sub fuel nozzle Ns, fuel mixer 45 and emulsion tube 44 are enclosed.

The respective main fuel nozzles Nm are commonly connected to a fuel distributor 8 which extends longitudinally in the arranged direction of the cylinders of the engine body E. In the preferred embodiment, the fuel distributor 8 is cast of a rigid material such as aluminum alloy. The fuel distributor 8 is formed with a main fuel passage 9 along its entire longitudinal length. The main fuel passage 9 has one end portion connected to a connecting tube 10 which attaches to a fuel supply tube. The other end of the main fuel passage 9 is shut off by means of a cap 11.

Fuel passages 12, corresponding to the mounting positions of each main fuel nozzle Nm, are formed through the fuel distributor 8 towards the engine body E to provide communication between the main fuel passage 9 and the main fuel nozzles Nm. The bottom portions of the fuel passages 12 have a fitting hole 13 formed in the side of the fuel distributor 8 which faces the engine body E.

Each of the main fuel nozzles Nm is formed at its rear end portion with both a small-diameter portion 14 and a retaining flange 15 having a larger diameter than the small-diameter portion 14. The rear end portion of the main fuel nozzles Nm is fitted in the fitting hole 13 such that an O-ring 16 surrounding the small-diameter portion 14 is sandwiched between the bottom portion of the fitting hole and the retaining flange 15. In addition, a cylindrical sleeve 18 with an inward flange 17 to be retained on the retaining flange 15 is fitted between the inner face of the fitting hole 13 and the outer face of the retaining flange 15. The cylindrical sleeves 18 enable the main fuel nozzles Nm to be mounted between the fuel passages 12 and the fitting holes 6 in a reliable manner without being offset in the radial direction.

Each of the main fuel nozzles Nm has its mid-portion held by a holding member 19 which is fastened to the fuel distributor 8. The fuel distributor 8 is fastened to a supporting portion 20 of the intake manifold Mi by means of a bolt 21. As a result, each of the main fuel nozzles Nm is supported between the fuel distributor 8 and the intake manifold Mi in such a way that its leading end portion is fitted within a fitting hole 6 of the intake manifold Mi and its trailing end portion is fitted within the fitting hole 13 of the fuel distributor 8.

The longitudinally central and upper portion of the fuel distributor 8 is formed with a flat mounting surface 22. A communication passage 23 is opened in the mounting surface 22 and communicates with the main fuel passage 9. A fuel branching member 24 for supplying fuel to the sub fuel nozzle Ns is mounted on the upper mounting surface 22. In the preferred embodiment, the fuel branching member 24 is also cast of a rigid material such as aluminum alloy and extends generally horizontally from the aforementioned upper mounting surface 22 in a direction towards the trunk portion 2 of the intake manifold Mi. The fuel branching member 24 thereby provides a generally horizontal lower mounting surface 25 which corresponds to the upper mounting surface 22 of the fuel distributor 8.

The fuel branching member 24 has a branched fuel passage 26 formed therethrough. A first end of the branched fuel passage 26 is made to communicate with a communication passage 27 opened in the lower mounting surface 25 of the fuel branching member 24. A second end of the branched fuel passage 26 is opened to the atmosphere. The second end of the branched fuel passages 26 hermetically sealed by means of a cap 28.

The lower face 25 of the fuel branching member 24 is fastened to the fuel distributor 8 by means of a bolt 29 near the engine body E. A guide sleeve 30 is inserted between the communication passage 23 in the fuel distributor 8 and the communication passage 27 in the fuel branching member 24 to provide positive alignment between the two communication passages 23 and 27. An annular seal member 31, fitted around the guide sleeve 30, is sandwiched between the upper mounting surface 22 of the fuel distributor 8 and the lower mounting surface 25 of the fuel branching member 24 to provide a hermetic between the fuel passages 9 and 26.

A branched passage 32 is formed within the fuel branching member 24 extending downwardly from the branched fuel passage 26 near the sealing cap 28. The branched passage 32 is made to communicate with a fitting hole 33 formed in the lower mounting surface 25 of the fuel branching member 24. The rear end portion of the sub fuel nozzle Ns is fitted into the fitting hole 33 of the fuel branching member 24. Specifically, the rear end portion of the sub fuel nozzle Ns is formed with a small diameter portion 34 and a retaining flange 35 which has a diameter larger than that of the small-diameter portion 34. The aforementioned rear portion is fitted into the fitting hole 33 such that an O-ring 36 surrounding the small-diameter portion 34 is sandwiched between the bottom portion of the fitting hole 33 and the retaining flange 35. A cylindrical sleeve 38 formed with an inward flange 37 to be retained by the retaining flange 35 is interposed between the inner face of the fitting hole 33 and the outer face of the retaining flange 35. The cylindrical sleeve 38 provides a positive alignment of the sub fuel nozzle Ns such that communication between the branched passage 32 may be had in a reliable manner without radial misalignment.

The sub fuel nozzle Ns has its midway portion held by a holding member 39 which is affixed to the lower mounting surface 25 of the fuel branching member 24 by means of a bolt 40. As a result, the rear end portion of the sub fuel nozzle Ns is fitted into the bottom portion of the fitting hole 33 so that an O-ring 36 between the branched passage 32 and the sub fuel nozzle Ns may provide a secure seal.

A holding cylinder 41 is fitted about the leading end portion of the sub fuel nozzle Ns and maintained in close contact with the upper surface of the intake manifold Mi when the fuel branching member 24 is fastened to the fuel distributor 8. A seal member 42 fitted between the holding cylinder 41 and the upper surface of the intake manifold Mi provides a secure seal therebetween. An accommodating chamber 43 is defined by the holding cylinder 41 and the intake manifold Mi. A hole 7 is formed through the intake manifold Mi to provide communication between the accommodating chamber 43 and the unit sub intake passage 5.

A mixing member 45 which is equipped with a emulsion tube 44 is accommodated within the accommodating chamber 43 and extends through the hole 7 into the unit sub intake passage 5. Bleed air is introduced to the upper portion of the accommodating chamber 43 so that the fuel may be emulsified by the mixing member 45 and injected into the unit sub intake passage 5 through the emulsion tube 44.

The fuel branching member 24 has a communication passage 46 formed near the midpoint of the branch fuel passage 26. A regulator valve 47, shown most clearly in FIG. 1, is connected to the communication passage 46. The regulator valve 47 functions to maintain fuel pressure at a constant level within the fuel passage 26 thereby regulating the injection pressure of the fuel from the main fuel nozzles Nm and the sub fuel nozzle Ns.

Having fully described the invention its operation will be described hereinbelow. When the main fuel nozzles Nm and the sub fuel nozzle Ns are to be attached to the intake manifold Mi, the main nozzles Nm are held by the respective holding members 19 such that the rear portions of the fuel nozzles Nm may be fitted into the fitting holes 13 of the fuel distributor 8. The holding members 19 are then fastened to the fuel distributor 8 which is connected to the supporting portion 20 of the intake manifold Mi by means of a bolt 21. The main fuel nozzles Nm are then fixedly supported between the upper mounting surface of the intake manifold Mi and the fuel distributor 8 such that their leading ends are fitted within the holes 6 communicating with the main combustion chambers.

The sub fuel injection nozzle Ns, retained by its holding member 39, is fitted into the fitting hole 33 of the fuel branching member 24. The holding member 39 is then attached to the lower mounting surface 25 of the fuel branching member 24 by means of the bolt 40. As a result, the rear end portion of the sub fuel nozzle Ns is attached to the fuel branching member 24.

The emulsion tube 44 is protruded through the hole 7 of the intake manifold Mi into the unit sub intake passage 5. The holding cylinder 41 is aligned above the mixing member 45 and the emulsion tube 44 and the leading end portion of the sub fuel nozzle Ns is fitted into the holding cylinder 41. The fuel branching member 24 is then fastened to the fuel distributor 8 by the bolt 29 so as to securely retain the leading end portion of the sub fuel nozzle Ns to the intake manifold Mi.

So assembled, the fuel is supplied to the fuel distributor 8 from the fuel supply tube attached to the connecting tube 10 and distributed from the main fuel passage 9 through the respective fuel passages 12 to the main fuel nozzles Nm. The fuel is then injected towards the intake ports 3 in accordance with the revolving periods of the corresponding engine cylinders. Simultaneously, fuel from the main fuel supply passage 9 is fed to the branch fuel passage 26 of the fuel branching member 24 and is injected from the sub fuel nozzle Ns into the accommodating chamber 43. The fuel is then emulsified with the bleed air in the mixing member 45 and injected from the emulsion tube 44 to the downstream side of the unit sub intake passage 5 in the intake direction where it subsequently enters the sub intake passages 5a and flows to the sub combustion chamber.

The embodiments of the invention described herein are intended for purposes of example only and should not be construed to limit the scope of the claims appended hereto.

We claim:

1. A fuel injection feeding system for an internal combustion engine having a plurality of main combustion chambers and sub combustion chambers, a plurality of main feed injection nozzles with rear ends, a sub fuel injection nozzle with a rear end and an intake manifold, comprising, a fuel distributor having a main fuel passage therethrough, said fuel distributor being mounted to the intake manifold, a fuel branching member having a branch fuel passage therethrough, an upper mounting surface formed on the upper side of said fuel distributor, a fuel communication passage through said upper surface communicating with said main fuel passage, a lower mounting surface formed on the lower side of said fuel branching member, a first end of said branch fuel passage being open to said lower mounting surface, a second end of said branch fuel passage being open to the atmosphere, means to connect said lower mounting surface to said upper mounting surface, a guide sleeve fitted within said first end of said branch fuel passage and said fuel communication passage in said upper mounting surface, an annular seal member fitted about said guide sleeve, means to seal said second end of said branch fuel passage, passageway means to insert the rear ends of the main fuel injection nozzles into said fuel distributor and passageway means to insert the rear end of the sub fuel injection nozzle into said fuel branch member.

2. A fuel injection feeding system for an internal combustion engine having a plurality of main combustion chambers and sub combustion chambers, a plurality of main feed injection nozzles with rear ends, a sub fuel injection nozzle with a rear end and an intake manifold with main intake passages for receiving the main feed injection nozzles and a sub intake passage for receiving the sub fuel injection nozzle, comprising, a fuel distributor means of a formed shape and having a main fuel passage and a branch fuel passage therethrough, said fuel distributor means having means for mounting to the intake manifold and said fuel distributor means having a plurality of passageway means communicating with said main fuel passage for receiving the rear ends of the main fuel injection nozzles into said fuel distributor means and a passageway means communicating with said sub fuel passage for receiving the rear end of the sub fuel injection nozzle into said fuel distributor means.

3. The fuel injection feeding system of claim 2 wherein said fuel distributor means is comprised of two formed elements connected together with one having said passageway means for receiving said main fuel injection nozzles and the other for receiving said sub fuel injection nozzle.

4. The fuel injection feeding system of claim 2 wherein said main fuel passage is a substantial straight hole positioned directly above the main fuel injection nozzles.

5. The fuel injection feeding system of claim 4 wherein a fuel supply inlet is provided at only one end of said main fuel passage.

6. The fuel injection feeding system of claim 2 wherein said branch fuel passage extends laterally from approximately the middle of said main fuel passage.

7. The fuel injection feeding system of claim 6 wherein a fuel pressure regulating means is connected to said branch fuel passage.

8. The fuel injection feeding system of claim 2 wherein a holding member is provided for each said injection nozzle and structurally and releasably mounts each said injection nozzle to said fuel distributor means.

* * * * *